(12) United States Patent
Lakshminarayanan et al.

(10) Patent No.: US 10,657,541 B2
(45) Date of Patent: *May 19, 2020

(54) DETERMINING AND USING BRAND INFORMATION IN ELECTRONIC COMMERCE

(71) Applicant: eBay Inc., San Jose, CA (US)

(72) Inventors: Arun Lakshminarayanan, San Jose, CA (US); Gurudatta Horantur Shivaswamy, Saratoga, CA (US); Jean-David Ruvini, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/170,415

(22) Filed: Oct. 25, 2018

(65) Prior Publication Data

US 2019/0108532 A1 Apr. 11, 2019

Related U.S. Application Data

(63) Continuation of application No. 13/623,697, filed on Sep. 20, 2012, now Pat. No. 10,140,621.

(51) Int. Cl.
*G06Q 30/02* (2012.01)

(52) U.S. Cl.
CPC .................. *G06Q 30/02* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| 5,585,793 | A | 12/1996 | Antoshenkov et al. |
| 6,098,892 | A * | 8/2000 | Peoples, Jr. ............... G06K 7/14 235/494 |
| 6,556,991 | B1 * | 4/2003 | Borkovsky ........... G06F 16/338 707/737 |
| 6,700,512 | B2 | 3/2004 | Abdat |
| 6,728,696 | B1 | 4/2004 | Walton |
| 6,847,972 | B1 | 1/2005 | Vernau et al. |
| 7,139,769 | B2 * | 11/2006 | Ouchi .................. G06Q 10/087 |
| 7,337,132 | B2 * | 2/2008 | Viswanath ............. G06Q 30/06 705/26.81 |

(Continued)

OTHER PUBLICATIONS

"U.S. Appl. No. 13/623,697, Non Final Office Action dated Mar. 13, 2014", 18 pgs.

(Continued)

*Primary Examiner* — Alan S Miller
(74) *Attorney, Agent, or Firm* — Holland & Hart LLP

(57) ABSTRACT

An apparatus and method for predicting a brand name of a product are disclosed herein. A product identification number for the product is converted into a normalized global trade item number (GTIN). For each of a plurality of GTIN prefixes corresponding to the normalized GTIN, brand names and counts of each of the brand names using product information stored in a product catalog are identified. A probability distribution of the brand names is determined in accordance with the brand names and the counts of the brand names for the plurality of the GTIN prefixes. A predicted brand name for the product is identified from among the brand names for the plurality of the GTIN prefixes, the predicted brand name having a highest probability score in the probability distribution of the brand names.

20 Claims, 13 Drawing Sheets

(56) References Cited

U.S. PATENT DOCUMENTS

| | | | |
|---|---|---|---|
| 7,533,042 B2* | 5/2009 | Shuder | G06Q 10/063118 705/28 |
| 7,602,785 B2 | 10/2009 | Dharmapurikar et al. | |
| 8,065,198 B2* | 11/2011 | Fuxman | G06Q 30/02 705/26.1 |
| 8,190,609 B1* | 5/2012 | Hall | G06F 16/951 707/736 |
| 8,195,663 B1* | 6/2012 | Hall | G06F 16/951 707/736 |
| 8,655,737 B1* | 2/2014 | Tromble | G06Q 30/00 705/1.1 |
| 8,700,494 B2* | 4/2014 | Carlson | G06Q 30/06 705/26.1 |
| 10,140,621 B2 | 11/2018 | Lakshminarayanan et al. | |
| 2001/0025277 A1* | 9/2001 | Hyldahl | G06F 16/954 |
| 2002/0013778 A1 | 1/2002 | Neal et al. | |
| 2003/0061121 A1* | 3/2003 | Ouchi | G06Q 30/06 705/26.5 |
| 2003/0172051 A1* | 9/2003 | Ouchi | G06Q 10/087 |
| 2003/0200155 A1* | 10/2003 | Ouchi | G06Q 10/0833 705/26.62 |
| 2004/0117271 A1 | 6/2004 | Knight et al. | |
| 2004/0143600 A1* | 7/2004 | Musgrove | G06Q 20/04 |
| 2005/0075945 A1* | 4/2005 | Hodge | G06Q 30/02 705/26.8 |
| 2005/0109844 A1* | 5/2005 | Hilliard | G06K 1/18 235/383 |
| 2005/0187951 A1* | 8/2005 | Chen | G06F 16/338 |
| 2005/0195832 A1 | 9/2005 | Dharmapurikar et al. | |
| 2006/0011720 A1* | 1/2006 | Call | A61L 2/10 235/383 |
| 2006/0242192 A1* | 10/2006 | Musgrove | G06Q 20/04 |
| 2008/0041950 A1* | 2/2008 | Michels | G06Q 20/342 235/419 |
| 2008/0313165 A1 | 12/2008 | Wu et al. | |
| 2010/0009801 A1 | 1/2010 | Nakamura | |
| 2010/0274786 A1 | 10/2010 | Harris et al. | |
| 2011/0289026 A1* | 11/2011 | Kannan | G06F 16/907 706/12 |
| 2012/0290553 A1* | 11/2012 | England | G06Q 30/0282 707/706 |
| 2012/0303412 A1* | 11/2012 | Etzioni | G06Q 30/06 705/7.31 |
| 2014/0081701 A1 | 3/2014 | Lakshminarayanan et al. | |

OTHER PUBLICATIONS

"GTIN Definition", [Online]. Retrieved from the Internet: https: web.archiveo.Org web 20110902152319 http: www.gtin.info , 3 pgs.

"U.S. Appl. No. 13/623,697, Response filed Jun. 13, 2014 to Non Final Office Action dated Mar. 13, 2014", 13 pgs.

"U.S. Appl. No. 13/623,697, Non Final Office Action dated Sep. 25, 2014", 18 pgs.

"", Definition of "generate" from Merriam-Webster, [Online]. Retrieved from the Internet: URL: (http: www.merriam-webster.com dictionary prefix, 4 pgs.

"", Definition of "prefix" from Merriam-Webster, [Online]. Retrieved from the Internet: URL: http: www.merriam-webster.com dictionary prefix, 3 pgs.

"", GTIN GS1 Company Prefix Ownership, [Online]. Retrieved from the Internet: URL: (http: www.gtin.info check-company-prefix, 3 pgs.

"U.S. Appl. No. 13/623,697, Response filed Mar. 18, 2015 to Non Final Office Action dated Sep. 25, 2014", 23 pgs.

"U.S. Appl. No. 13/623,697, Examiner Interview Summary dated Mar. 23, 2015", 3 pgs.

"U.S. Appl. No. 13/623,697, Final Office Action dated Jun. 3, 2015", 9 pgs.

"U.S. Appl. No. 13/623,697, Examiner Interview Summary dated Sep. 2, 2015", 3 pgs.

"U.S. Appl. No. 13/623,697, Appeal Brief filed Jan. 4, 2016", 24 pgs.

"U.S. Appl. No. 13/623,697, Appeal Decision dated Oct. 20, 2017", 13 pgs.

"U.S. Appl. No. 13/623,697, Request to Reopen Prosecution filed Dec. 20, 2017", 12 pgs.

"U.S. Appl. No. 13/623,697, Non Final Office Action dated Feb. 9, 2018", 8 pgs.

"U.S. Appl. No. 13/623,697, Examiner Interview Summary dated Mar. 28, 2018", 3 pgs.

"U.S. Appl. No. 13/623,697, Response filed May 9, 2018 to Non Final Office Action dated Feb. 9, 2018", 12 pgs.

"U.S. Appl. No. 13/623,697, Notice of Allowance dated Jul. 18, 2018", 8 pgs.

"Examiner's Answer to Appeal Brief received for U.S. Appl. No. 13/623,697, mailed on Jun. 13, 2016", (Jun. 13, 2016) 13 pages.

* cited by examiner

| prefix | total occurrences | occurrence by brand |
|---|---|---|
| 063924 | 100 | b1=25, b2=30, b3=20, b4=5, b5=5, b6=10, b7=3, b8=2 |
| 0639247 | 75 | b2=30, b3=20, b4=5, b5=5, b6=10, b7=3, b8=2 |
| 06392478 | 70 | b2=30, b3=20, b4=5, b5=5, b6=10 |
| 063924786 | 65 | b2=30, b3=20, b4=5, b6=10 |
| 0639247860 | 35 | b2=30, b4=5 |

500 → ; 502 prefix; 504 total occurrences; 506 occurrence by brand

FIG. 5A

| brand | 063924 | 0639247 | 06392478 | 063924786 | 0639247860 | best |
|---|---|---|---|---|---|---|
| b1 | 0.250 | | | | | 0.250 |
| b2 | 0.300 | 0.400 | 0.428 | 0.461 | 0.857 | 0.857 |
| b3 | 0.200 | 0.266 | 0.286 | 0.308 | | 0.308 |
| b4 | 0.050 | 0.066 | 0.071 | 0.076 | 0.142 | 0.142 |
| b5 | 0.050 | 0.066 | 0.071 | | | 0.071 |
| b6 | 0.010 | | | | | 0.010 |
| b7 | 0.003 | 0.040 | | | | 0.040 |
| b8 | 0.002 | 0.026 | | | | 0.026 |

FIG. 5B

| gtin_prefix | co-occurring barnds |
|---|---|
| 04003121044 | b1, b2, b3, b4 |
| 04003121045 | b2, b5, b6 |
| 07313460 | b7, b8, b9, b10 |

|    | b1    | b2    | b3    | b4    |
|----|-------|-------|-------|-------|
| b1 | 1.000 | 0.867 | 0.292 | 0.245 |
| b2 |       | 1.000 | 0.433 | 0.929 |
| b3 |       |       | 1.000 | 0.342 |
| b4 |       |       |       | 1.000 |

|    | b2    | b5    | b6    |
|----|-------|-------|-------|
| b2 | 1.000 | 0.832 | 0.211 |
| b5 |       | 1.000 | 0.632 |
| b6 |       |       | 1.000 |

| normalized form | synonym |
|-----------------|---------|
| b4              | b1      |
| b4              | b2      |
| b4              | b4      |
| b4              | b5      |

FIG. 8D

| Normalized form | Brand synonyms |
| --- | --- |
| sony | sony legacy |
| sony | sony audio video |
| sony | sony wonder |
| sony | sony batteries |
| sony | sony playstation 3 |
| sony | sony playstation 2 |
| sony | sony electronics inc |
| sony | sony electronics |
| sony | sony home audio video |
| sony | sony playstation |
| sony | sony psp |
| sony | sony photo video |
| sony | sony discos mp |
| sony | sony music entertainment |
| sony | sony vaio retail products |
| sony | sony vaio accessories |
| sony | sony creative software |
| sony | sony computer electronic |
| sony | sony computer entertainme |
| sony | sony columbia |
| sony | sony ericsson |
| sony | sony discos j & n records |
| sony | sony discos globo |
| sony | sony storage tape drives |
| sony | sony discos luna music |
| sony | sony ip surveillance |
| sony | sony electronics  inc. |
| sony | sony word |
| sony | sony entertainment |
| sony | sony media software |
| sony | sony dslr |
| sony | sony vaio |
| sony | sony music |
| sony | sony online entertainment |
| sony | sony discos |
| sony | sony smap |
| sony | sony plasma |
| sony | sony epic |
| sony | sony security |
| sony | sony discos orfeon |
| sony | sony classics |
| sony | sony projectors |

FIG. 8E

DETERMINING AND USING BRAND INFORMATION IN ELECTRONIC COMMERCE

CLAIM OF PRIORITY

This Application is a Continuation of U.S. application Ser. No. 13/623,697, filed Sep. 20, 2012, which is hereby incorporated by reference in its entirety.

TECHNICAL FIELD

The present application relates generally to systems and methods to facilitate use of brand names in an online marketplace.

BACKGROUND

An electronic marketplace offers a large number of items for sale. It is not uncommon for some electronic marketplaces to offer upwards of hundreds of thousands or millions of items for sale. Each item to be offered for sale is submitted to the electronic marketplace, the submission including information about the item such as an item name, item description, and item image. If the item is associated with a recognizable manufacturer, distributor, or otherwise a source—the item being a brand name item—such source or brand name information may be submitted to the electronic marketplace.

A plurality of persons may enter item information corresponding to the plurality of items to be offered by the electronic marketplace. For example, the plurality of persons can be a plurality of sellers, each seller submitting one or more items to the electronic marketplace. A multitude of contributors, however, increases the possibility of non-uniformity in item information among the submitted items. Even identical items may be submitted with differing item information, such as non-identical brand names. Non-uniformity in item information or descriptions among items in a catalog increases inefficiencies and inaccuracies in downstream processes involving use of the stored item information. For example, incorrect or incomplete identification of items may occur in response to product search requests due to the non-uniformity in item information in the product catalog.

BRIEF DESCRIPTION OF THE DRAWINGS

Some embodiments are illustrated by way of example and not limitations in the figures of the accompanying drawings, in which:

FIG. 5A illustrates an example brand weight or occurrence table/matrix specific to a set of GTIN prefixes according to some embodiments.

FIG. 5B illustrates an example brand probability distribution table/matrix according to some embodiments.

FIGS. 8A-8E illustrate tables/matrices generated to determine brand synonyms in FIG. 7 according to some embodiments.

The headings provided herein are for convenience only and do not necessarily affect the scope or meaning of the terms used.

DETAILED DESCRIPTION

Described in detail herein is an apparatus and method for determining brand names and using brand names in an electronic commerce environment. In one embodiment, product information of items in a product catalog and product information captured from crawling the web are available. Product information for a given item can include a product identification number as well as a brand name. Such product identification numbers and brand names across a large plurality of items are used to predict a brand for a new item being submitted to the product catalog. The brand prediction may be useful to fill in missing brand information for the new item being submitted, or to validate the brand information provided for the new item. The product identification numbers and brand names across a large plurality of items are also used to determine brand synonyms. Knowledge of brand synonyms improves accuracy of product searching, product matching, product aggregation, product deduping, product attribute value normalization, and the like.

The following description is presented to enable any person skilled in the art to create and use a computer system configuration and related method and article of manufacture to determine and use brand name information in an electronic commerce environment. Various modifications to the example embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein.

Figure 1:
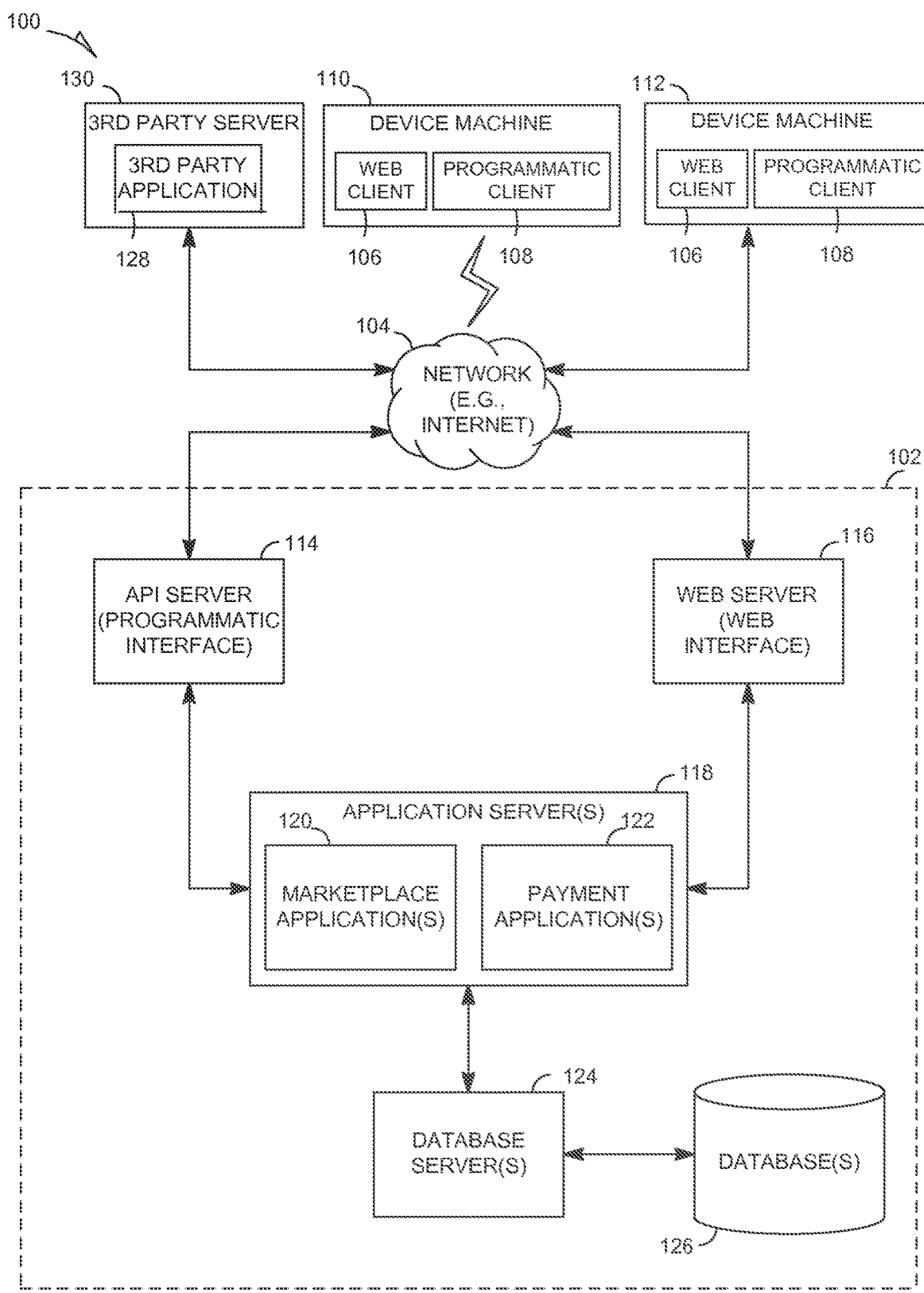
FIG. 1 illustrates a network diagram depicting an example system for facilitating use of brands according to some embodiments.

FIG. 1 illustrates a network diagram depicting an example system 100 to facilitate classification and use of brands associated with goods, product, and/or services (collectively referred to as items) in an electronic commerce (e-commerce), electronic marketplace, and/or online marketplace environment according to some embodiments. A networked system 102 forms a network-based publication system that provides server-side functionality, via a network 104 (e.g., the Internet or Wide Area Network (WAN)), to one or more clients and devices. FIG. 1 further illustrates, for example, one or both of a web client 106 (e.g., a web browser) and a programmatic client 108 executing on device machines 110 and 112. In one embodiment, the publication system 100 comprises a marketplace system. In another embodiment, the publication system 100 comprises other types of systems such as, but not limited to, a social networking system, a matching system, an electronic commerce (e-commerce) system, and the like.

Each of the device machines 110, 112 comprises a computing device that includes at least a display and communication capabilities with the network 104 to access the networked system 102. The device machines 110, 112 comprise, but are not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the client machines 110, 112 may connect with the network 104 via a wired or wireless connection. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the device machines 110, 112 includes one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the device machines 110, 112, then this application is configured to locally provide the user interface and at least some of the functionalities with the application configured to communicate with the networked system 102, on an as needed basis, for data and/or processing capabilities not locally available (such as access to a database of items available for sale, to authenticate a user, to verify a method of payment, etc.). Conversely if the e-commerce site application is not included in a given one of the device machines 110, 112, the given one of the device machines 110, 112 may use its web browser to access the e-commerce site (or a variant thereof) hosted on the networked system 102. Although two device machines 110, 112 are shown in FIG. 1, more or less than two device machines can be included in the system 100.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of e-commerce functions and services to users that access networked system 102. E-commerce functions/services may include a number of publisher functions and services (e.g., searching, listing, content viewing, payment, etc.). For example, the marketplace applications 120 may provide a number of services and functions to users for listing goods and/or services or offers for goods and/or services for sale, searching for goods and services, facilitating transactions, and reviewing and providing feedback about transactions and associated users. Additionally, the marketplace applications 120 may track and store data and metadata relating to listings, transactions, and user interactions. In some embodiments, the marketplace applications 120 may publish or otherwise provide access to content items stored in application servers 118 or databases 126 accessible to the application servers 118 and/or the database servers 124. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products or items (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102. In other embodiments, the payment applications 122 may be omitted from the system 100. In some embodiments, at least a portion of the marketplace applications 120 may be provided on the device machines 110 and/or 112.

Further, while the system 100 shown in FIG. 1 employs a client-server architecture, embodiments of the present disclosure is not limited to such an architecture, and may equally well find application in, for example, a distributed or peer-to-peer architecture system. The various marketplace and payment applications 120 and 122 may also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
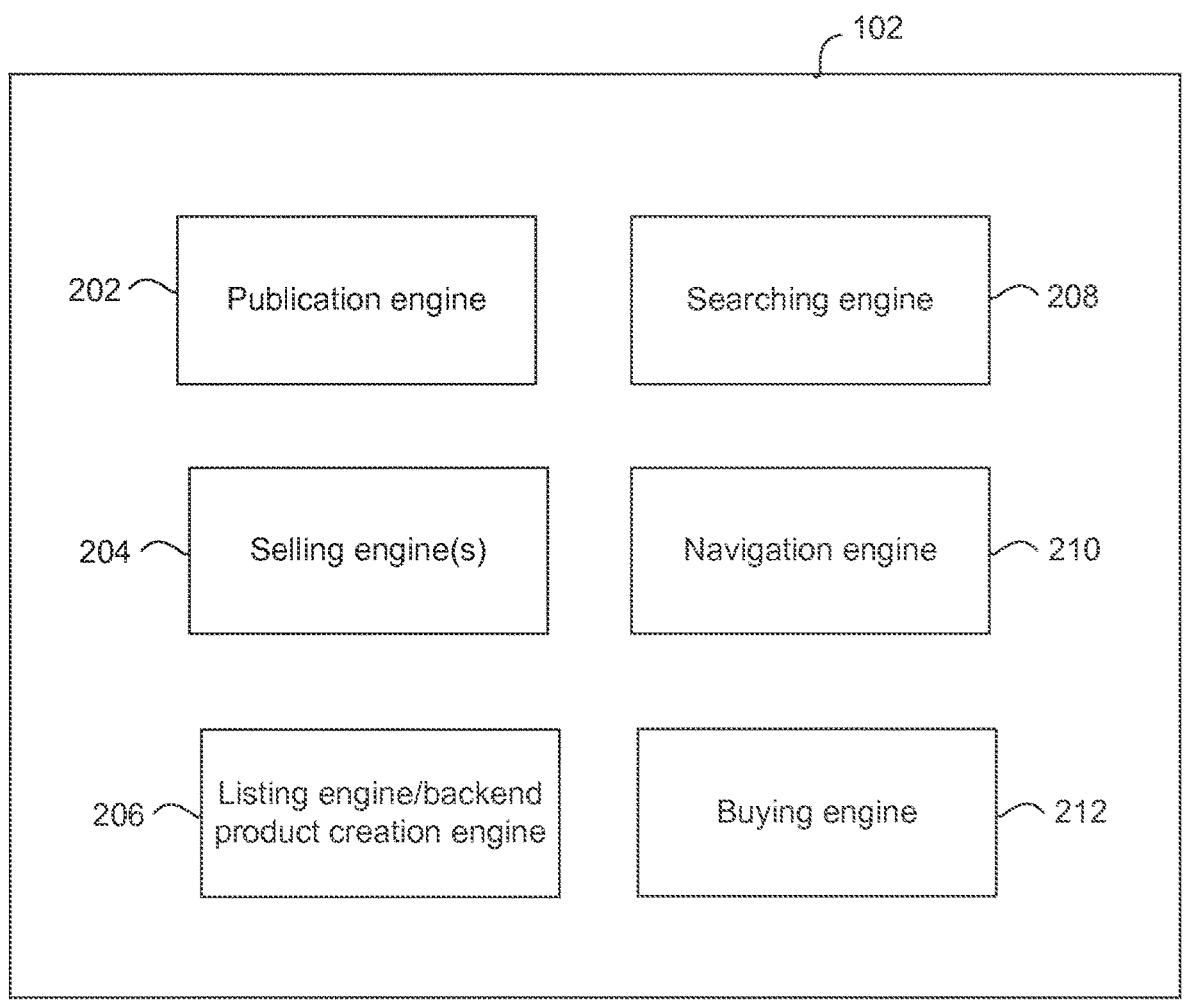
FIG. 2 illustrates a block diagram of additional details of the example system of FIG. 1 according to some embodiments.

FIG. 2 illustrates a block diagram showing components provided within the networked system 102 according to some embodiments. The networked system 102 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the data servers 128.

The networked system 102 may provide a number of publishing, listing, and/or price-setting mechanisms whereby a seller (also referred to as a first user) may list (or publish information concerning) goods or services for sale or barter, a buyer (also referred to as a second user) can express interest in or indicate a desire to purchase or barter such goods or services, and a transaction (such as a trade) may be completed pertaining to the goods or services. To this end, the networked system 102 may comprise at least one publication engine 202 and one or more selling engines 204. The publication engine 202 may publish information, such as item listings or product description pages, on the networked system 102. In some embodiments, the selling engines 204 may comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding. The selling engines 204 may further comprise one or more deal engines that support merchant-generated offers for products and services.

A listing engine 206 (also referred to as a backend product creation engine) allows sellers to conveniently author listings of items or authors to author publications. In one embodiment, the listings pertain to goods or services that a user (e.g., a seller) wishes to transact via the networked system 102. In some embodiments, the listings may be an offer, deal, coupon, or discount for the good or service. Each good or service is associated with a particular category. The listing engine 206 may receive listing data such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the networked system 102 (e.g., databases 126). Listings also may comprise product description pages that display a product and information (e.g., product title, specifications, and reviews) associated with the product. In some embodiments, the product description page may include an aggregation of item listings that correspond to the product described on the product description page.

The listing engine 206 also may allow buyers to conveniently author listings or requests for items desired to be purchased. In some embodiments, the listings may pertain to goods or services that a user (e.g., a buyer) wishes to transact via the networked system 102. Each good or service is associated with a particular category. The listing engine 206 may receive as much or as little listing data, such as title, description, and aspect name/value pairs, that the buyer is aware of about the requested item. In some embodiments, the listing engine 206 may parse the buyer's submitted item information and may complete incomplete portions of the listing. For example, if the buyer provides a brief description of a requested item, the listing engine 206 may parse the description, extract key terms and use those terms to make a determination of the identity of the item. Using the determined item identity, the listing engine 206 may retrieve additional item details for inclusion in the buyer item request. In some embodiments, the listing engine 206 may assign an item identifier to each listing for a good or service.

In some embodiments, the listing engine 206 allows sellers to generate offers for discounts on products or services. The listing engine 206 may receive listing data, such as the product or service being offered, a price and/or discount for the product or service, a time period for which the offer is valid, and so forth. In some embodiments, the listing engine 206 permits sellers to generate offers from the sellers' mobile devices. The generated offers may be uploaded to the networked system 102 for storage and tracking.

Searching the networked system 102 is facilitated by a searching engine 208. For example, the searching engine 208 enables keyword queries of listings published via the networked system 102. In example embodiments, the searching engine 208 receives the keyword queries from a device of a user and conducts a review of the storage device storing the listing information. The review will enable compilation of a result set of listings that may be sorted and returned to the client device (e.g., device machine 110, 112) of the user. The searching engine 308 may record the query (e.g., keywords) and any subsequent user actions and behaviors (e.g., navigations).

The searching engine 208 also may perform a search based on the location of the user. A user may access the searching engine 208 via a mobile device and generate a search query. Using the search query and the user's location, the searching engine 208 may return relevant search results for products, services, offers, auctions, and so forth to the user. The searching engine 208 may identify relevant search results both in a list form and graphically on a map. Selection of a graphical indicator on the map may provide additional details regarding the selected search result. In some embodiments, the user may specify as part of the search query a radius or distance from the user's current location to limit search results.

The searching engine 208 also may perform a search based on an image. The image may be taken from a camera or imaging component of a client device or may be accessed from storage.

In a further example, a navigation engine 210 allows users to navigate through various categories, catalogs, or inventory data structures according to which listings may be classified within the networked system 102. For example, the navigation engine 210 allows a user to successively navigate down a category tree comprising a hierarchy of categories (e.g., the category tree structure) until a particular set of listing is reached. Various other navigation applications within the navigation engine 210 may be provided to supplement the searching and browsing applications. The navigation engine 210 may record the various user actions (e.g., clicks) performed by the user in order to navigate down the category tree.

The buying engine 212 facilitates one or more buyers to purchase goods or services offered by the networked system 102. The buying engine 212 may provide a user interface to receive indications of goods or services to be purchased, billing information, shipping information, shipping preferences, and the like for a buyer to initiate and complete a purchase of goods or services of interest.

Additional modules and engines associated with the networked system 102 are described below in further detail. It should be appreciated that modules or engines may embody various aspects of the details described below.

Figure 3:
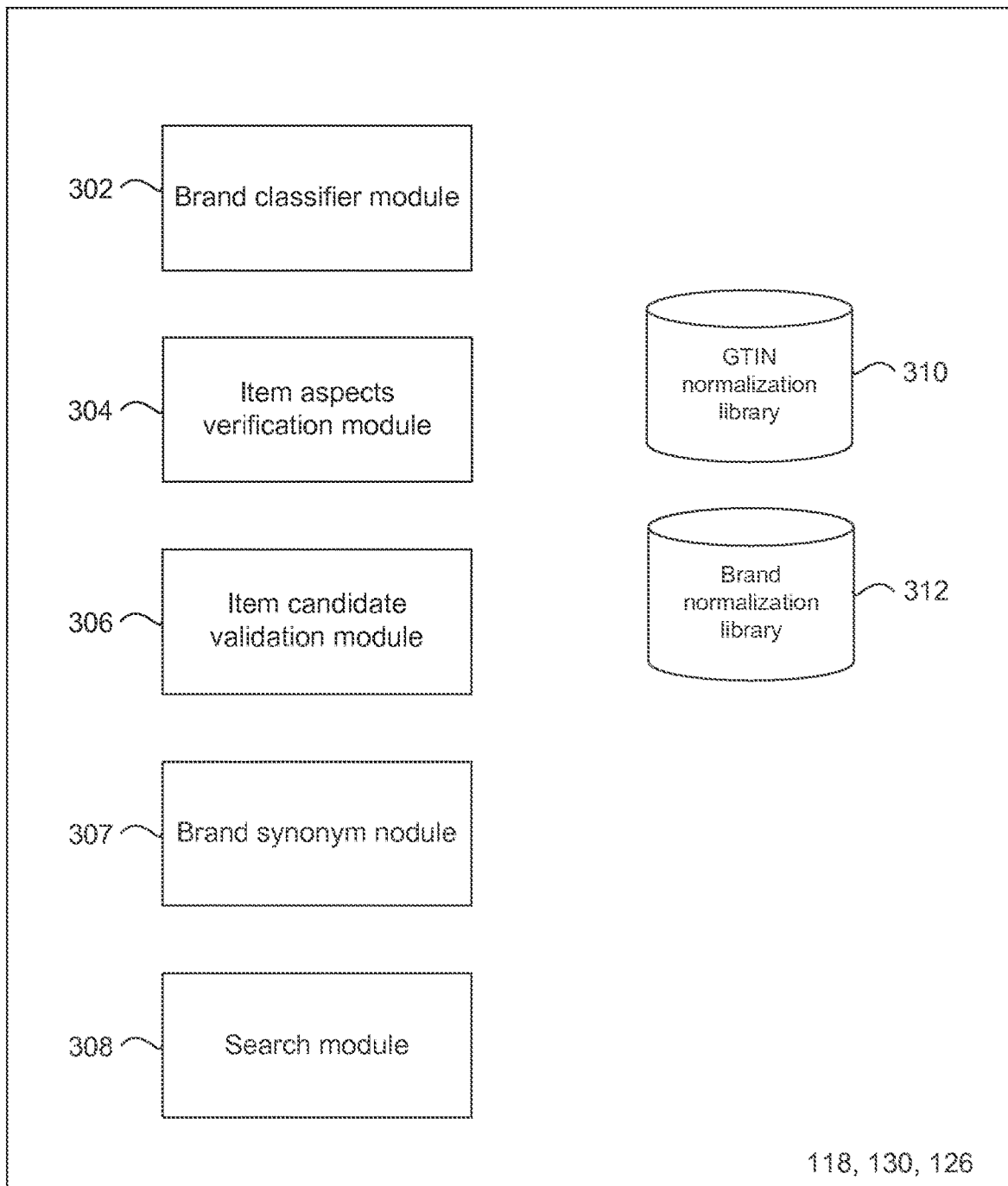
FIG. 3 illustrates a block diagram showing brand identification and usage for an electronic marketplace implemented in modules according to some embodiments.

FIG. 3 illustrates a block diagram showing brand determination and usage for e-commerce or marketplace implemented in modules and libraries/data structures/databases according to some embodiments. The modules comprise one or more software components, programs, applications, apps, or other units of code base or instructions configured to be executed by one or more processors included in the application servers 118 and/or third party server 130. The modules include a brand classifier module 302, an item aspects verification module 304 (may be part of selling engines 204), an item candidate validation module 306 (may be part of listing engine/backend product creation engine 206), a brand synonym module 307, and a search module 308. The modules 302-308 can communicate with each of a GTIN normalization library 310 and a brand normalization library 312, in which libraries 310, 312 may be included in databases 126. Although modules 302-308 are shown as distinct modules in FIG. 3, it should be understood that modules 302-308 may be implemented as fewer or more modules than illustrated. It should also be understood that any of modules 302-308 may communicate with one or more components included in the system 100, such as database servers 124, application servers 118, third party server 130, device machine 110, or device machine 112. Similarly, libraries 310 and 312 are shown as distinct libraries in FIG. 3. However, it is understood that the content of libraries 310, 312 may be stored in fewer or more libraries than illustrates.

Figure 4:
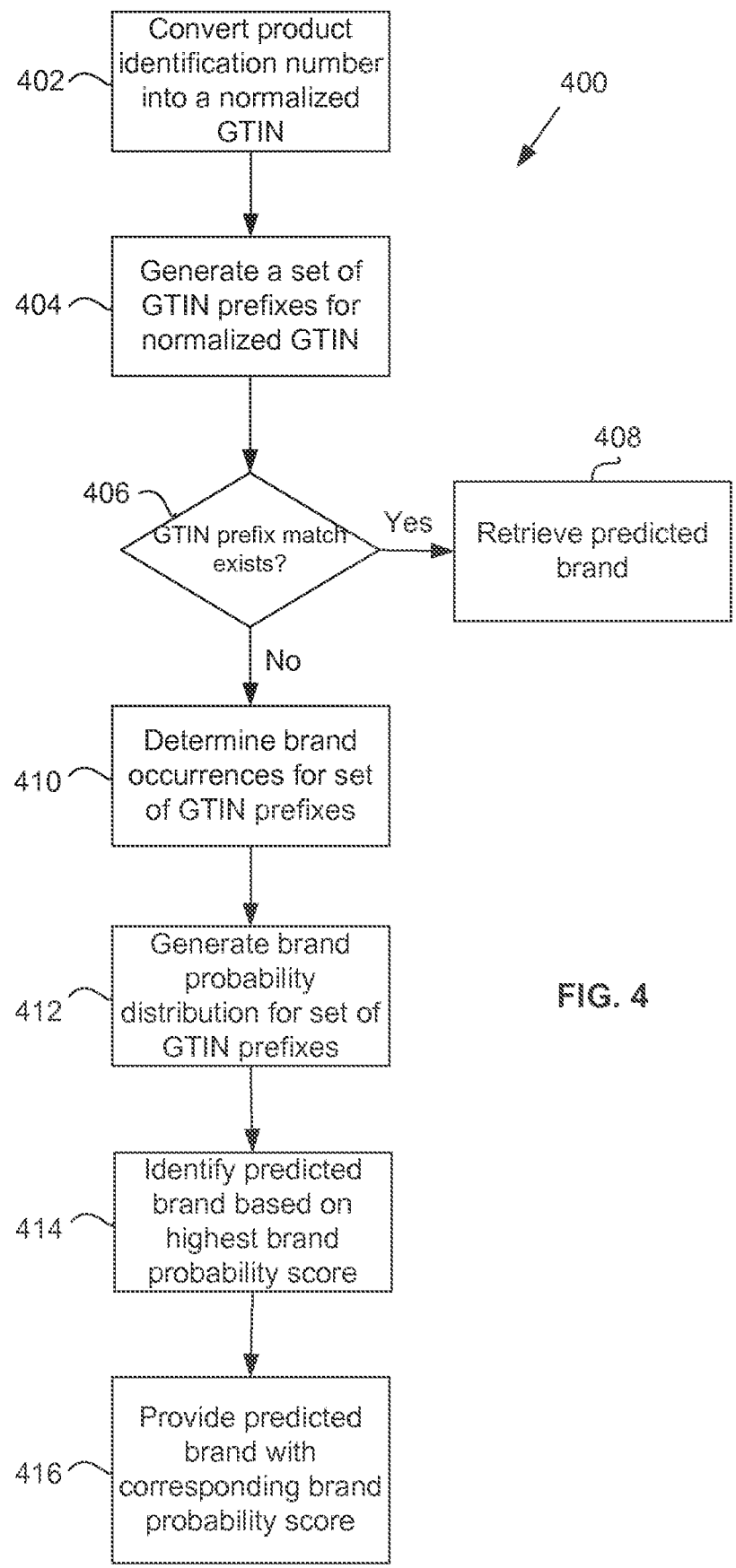
FIG. 4 illustrates a flow diagram showing brand prediction functionalities or operations implemented by the modules of FIG. 3 according to some embodiments.

FIG. 4 illustrates a flow diagram 400 showing brands prediction functionalities or operations implemented by the modules of FIG. 3 according to some embodiments. Brand prediction is also referred to as brand classification, brand classification prediction, brand probabilistic prediction, brand modeling, brand classification modeling, or variants thereof. The operations of flow diagram 400 can be performed by a server included in the networked system 102 (e.g., API server 114, web server 116, or application servers 118) and/or third party server 130. FIGS. 5A-5B illustrate example tables or matrices associated with the brand prediction functionalities of FIGS. 3 and 4. FIGS. 3, 4, and 5A-5B are described below in conjunction with each other.

At a block 402, the brand classifier module 302 (also referred to as a brand predictor module) is configured to convert a product identification number into a normalized GTIN. The product identification number (also referred to as a product identifier) includes identification information about a manufacturer, distributor, or source; a product model; and color or other variations of the product model, etc. associated with a particular item. The product identification number comprises alpha numeric digits associated with a specific good/product/item such as, but not limited to, a universal product code (UPC), international (or European) article number (EAN), international article numbering association (ISBN), or in accordance with other product identification numbering formats. A UPC can comprise 8-, 12-, 13, or 14-digit formats; an EAN can comprise 8-, 13, or 15-digit formats; and ISBN can comprise 10- or 13-digit formats.

Different product types may use different product identification numbering formats. For example, each book title may be identified by a unique ISBN while electronics may be identified using UPCs. Due to the proliferation of formats, even for the same product type (e.g., UPC being any of four formats), the (initial) product identification number is converted into a standard format, such as a 13-digit GTIN (also referred to as a normalized GTIN or normalized 13-digit GTIN). Reference is made to the following links, which provide example algorithms to convert different types of product identification numbers (UPC, EAN, and ISBN) to a normalized 13-digit GTIN:
http://en.wikipedia.org/wiki/Universal_Product_Code, http://www.nepc.gsl.org.sg/html/DataDictionary/EANCode.htm, and http://isbn-information.com/isbn10-to-isbn13.html.

Once the product identification number has been converted into a 13-digit GTIN, the brand classifier module 302 is configured to generate a set of GTIN prefixes corresponding to the 13-digit GTIN at a block 404. The normalized GTIN comprises 13 alpha numeric digits, the first 12 digits defining at least a unique manufacturer/distributor/source and a product/item/good and the last digit being a checksum digit. In particular, the first six to ten digits of the normalized GTIN encode manufacturer/distributor/source information (representative of a brand or brand name). The set of GTIN prefixes comprises a first, second, third, fourth, and fifth GTIN prefix that are respectively the first six-, seven-, eight-, nine-, and ten-digits of the normalized GTIN.

For example, let's assume that a 13-digit GTIN is 0639247860018. The corresponding set of GTIN prefixes are: 063924, 0639247, 06392478, 063924786, and 0639247860.

Next at a block 406, the brand classifier module 302 is configured to check for a match between any of the generated GTIN prefixes (from block 404) and a file or database of known GTIN prefixes from existing listing items and production information captured from the Internet (e.g., such content stored in the GTIN normalization library 310). If there is a prefix match (yes branch of block 406), then the known brand corresponding to the matching known GTIN in the file or database can be retrieved by (or provided to) the brand classifier module 302 at a block 408. This brand is referred to as a predicted brand for the product identification number.

Otherwise there is no prefix match (no branch of block 406) and the brand classifier module 302 proceeds to determine brand occurrences for the set of GTIN prefixes at a block 410. A brand weight table or matrix is generated using the set of GTIN prefixes (from block 404) and a file or database of known brand occurrences (e.g., GTIN normalization library 310). This file or database is generated using all or a subset of items submitted to the networked system 100. Each item to be offered for sale is submitted to the networked system 100 including item information (e.g., item name, item description, product identification number, image, etc.) associated with the respective item. The networked system 100 can use the submitted item information for all or a subset of items to generate the file or database of known GTIN prefixes (converting provided product identification numbers as necessary) and corresponding brand occurrences (from the provided item names and/or item descriptions). The file or database comprises an aggregation of the number of brand occurrences for each GTIN prefix, and is an extraction or summary of known/real item information in the networked system 102. The file or database is accordingly also referred to as a weight file or brand occurrence file. The weight file may be updated on a periodic or ad hoc basis as item information is updated, the catalog of submitted items changes over time, and/or product information captured from the web changes over time.

A portion of a sample weight file is shown below, in which the leftmost column comprises GTIN prefixes, the middle column comprises a total count of the number of brand occurrences for the respective GTIN prefix, and the rightmost column comprises a breakdown of the specific brand names and corresponding count for the respective GTIN prefix.

. . .
0014671638 51 maidenform=34;charmed by maidenform-15;maidenform's charmed-2
00146716382 11 maidenform-10;maidenform's charmed=1;
001467164 534 self expressions-6;control it-2;maidenform-316;charmed by maidenform-185; maidenform's charmed-25;
00146716410 13 maidenform-6;charmed by maidenform-6; maidenform's charmed-1;
. . .
0015961153 65 milliken-62;milliken carpets-3;
00159611532 11 milliken-9;milliken carpets-2;
00159611533 11 milliken-10;milliken carpets-1;
. . .
00165655 54 highnote records-39;muse-4;jdc records-4; muserecords-5;www.secondspin.com-2;
001656553 4 highnote records-2;muse records-1;www.secondspin.com-1;
001656554 24 highnote records-19;muse-1;muse records-3; www.secondspin.com-1;
00165655540 4 highnote records-2;muse-1;muse records-1;
00165655488 2 highnote records-1;muse records-1;
001656555 21 highnote records-15;muse-3;jdc records-2; muse records-1;

As an example, the first row shows that for GTIN prefix 0014671638, a total of 51 brand occurrences exist, in which there are 34 occurrences of brand "maidenform," 15 occurrences of brand "charmed by maidenform," and 2 occurrences of brand "maidenform's charmed." The weight file may be updated on a periodic or ad hoc basis as item information is updated and/or the catalog of submitted items changes over time.

FIG. 5A illustrates an example brand weight or occurrence table/matrix 500 specific to the set of GTIN prefixes according to some embodiments. Table/matrix 500 continues the above example in which the 13-digit GTIN is 0639247860018 and the corresponding set of GTIN prefixes are 063924, 0639247, 06392478, 063924786, and 0639247860. Table/matrix 500 includes a GTIN prefix column 502, a total occurrences column 504, and occurrences by brand column 506. Each of the "b1," "b2," etc. listed under column 506 represent a unique brand name. The brand predictor module 304 can extract the total occurrences and occurrences by brand data corresponding to the set of GTIN prefixes from the above weight file to generate table/matrix 500. Notice that the number of distinct brands decreases as the GTIN prefix gets longer.

Next at a block 412, the brand classifier module 302 is configured to generate a brand probability distribution for the set of GTIN prefixes. FIG. 5B illustrates an example brand probability distribution table/matrix 510 according to some embodiments. Table/matrix 510 continues the above example in which the 13-digit GTIN is 0639247860018. Table/matrix 510 includes a brand column 512, followed by a series of GTIN prefix columns 514, and a best probability column 516. The table/matrix 510 is populated by converting the contents of table/matrix 500 into probability numbers. For example, b1 occurs once in table/matrix 500 in the first row (GTIN prefix 063924). The probability of the occurrence of b1 is 25/100=0.250. This probability is shown at location 518 of table/matrix 510. Similarly, the probability of the occurrence of b2 for GTIN prefix 063924 is 30/100=0.3000 (shown in location 520), for GTIN prefix 0639247 is 30/75=0.400 (shown in location 522), for GTIN prefix 06392478 is 30/70=0.428 (shown in location 524), for GTIN prefix 063924786 is 30/65=0.461 (shown in location 526), and for GTIN prefix 0639247860 is 30/35=0.857 (shown in location 528). The highest or best probability number for each row is identified in the best probability column 516. The highest probability number for the second row (brand b2), for example, is found at location 528 and is duplicated under the best probability column 516.

Next at a block 414, the brand classifier module 302 is configured to identify or determine a predicted brand for the given product identification number (which corresponds to a particular GTIN and which in turn corresponds to a particular set of GTIN prefixes). The brand classifier module 302 identifies the best or highest brand probability score/value from the generated brand probability distribution in block 412. The predicted brand is the brand corresponding to the best brand probability score in the generated brand probability distribution. The best brand probability score represents the highest probability across all co-occurring brands and all GTIN prefixes for the given product identification number.

Continuing the above example, the best brand probability score in table/matrix 510 is 0.857 (shown in location 530). This value corresponds to brand b2. Thus, brand b2 is the predicted brand for the set of GTIN prefixes 063924, 0639247, 06392478, 063924786, and 0639247860.

Last, at a block 416, the brand classifier module 302 is configured to provide the predicted brand name along with the brand probability score.

FIG. 4 thus illustrates operations to predict a brand based on a given product identification number or GTIN.

Figure 6:
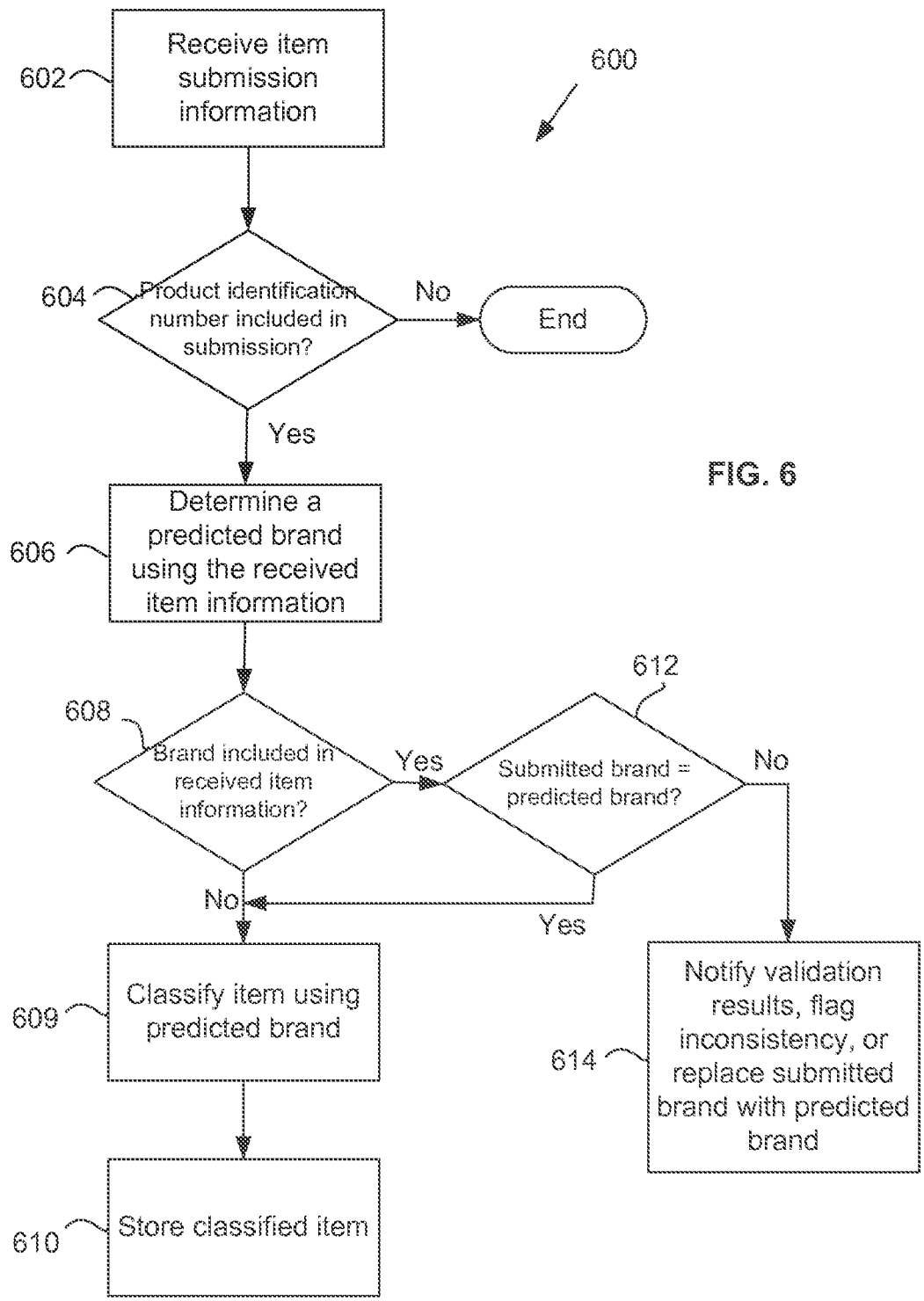
FIG. 6 illustrates a flow diagram showing uses of the brand classification model of FIG. 4 according to some embodiments.

FIG. 6 illustrates a flow diagram 600 showing uses of the brand classification of FIG. 4 according to some embodiments. The operations of flow diagram 600 can be performed by a server included in the networked system 102 (e.g., API server 114, web server 116, or application servers 118) and/or third party server 130. At a block 602, the networked system 102 receives item information associated with submission of a new item to be offered for sale (or at least listed). As an example, a seller may interface with input fields or screens provided by the networked system 102 to input information about the item being submitted such as, but not limited to, a product identification number (e.g., UPC, EAN, ISBN), brand (e.g., Apple™), product model (e.g., iPad 2), item specification (e.g., color, size, configuration, included accessories, etc.), and/or photos of the item.

Next at a block 604, the item aspects verification module 304 and/or product candidate validation module 306 checks whether a product identification number is included in the item submission information at block 602. If there is no product identification number provided (no branch of block 604), then the flow diagram 600 ends. Otherwise a product identification number has been provided (yes branch of block 604), and the brand classifier module 302 is configured to determine a predicted brand based on the received product identification number at a block 606. Block 606 includes using the GTIN normalization library 310 to normalize the received product identification number into a 13 digit GTIN and predicting the brand name corresponding to the 13 digit GTIN. In other words, block 606 comprises performing the operations of blocks 402-416 of FIG. 4.

Once the predicted brand has been determined or identified, a check is performed to see whether a brand name is included in the received item information (block 608). If there is no brand name included in the received item information (no branch of block 608), then the product candidate validation module 306 is configured to classify the newly submitted item (along with its item information) using the predicted brand determined in block 606. In effect, the product candidate validation module 306 is filling in the missing brand information for the newly submitted item with the predicted brand. Then at a block 610, the item information, including the predicted brand, for the newly submitted item is stored in a catalog of items available for sale.

On the other hand if a brand name is included in the received item information (yes branch of block 608), then a validation check is performed at a block 612 to see whether the submitted brand name matches the predicted brand name. If there is a match (yes branch of block 612), then the product candidate validation module 306 classifies the newly submitted item (along with its item information) using the predicted brand (or submitted brand, both of which are identical to each other) at the block 609.

If the validation check reveals that the submitted brand name does not match the predicted brand name (no branch of block 612), then the product candidate validation module 306 is configured to notify the seller (or other designated person) of a possible error in the submitted brand information and suggest changing the submitted brand information to the predicted brand (block 614). Alternatively the product candidate validation module 306 may flag the inconsistency within the catalog but not necessarily notify the seller. As another alternative, the product candidate validation module 306 may replace the submitted brand with the predicted brand in the item information associated with the newly submitted item. In addition to the value of properly classifying items within the catalog for retrieval purposes (discussed in detail below), sellers and buyers also benefit from having accurate and complete item descriptions, particularly the item brand, published by the networked system 102 to facilitate sale of items.

Figure 7:
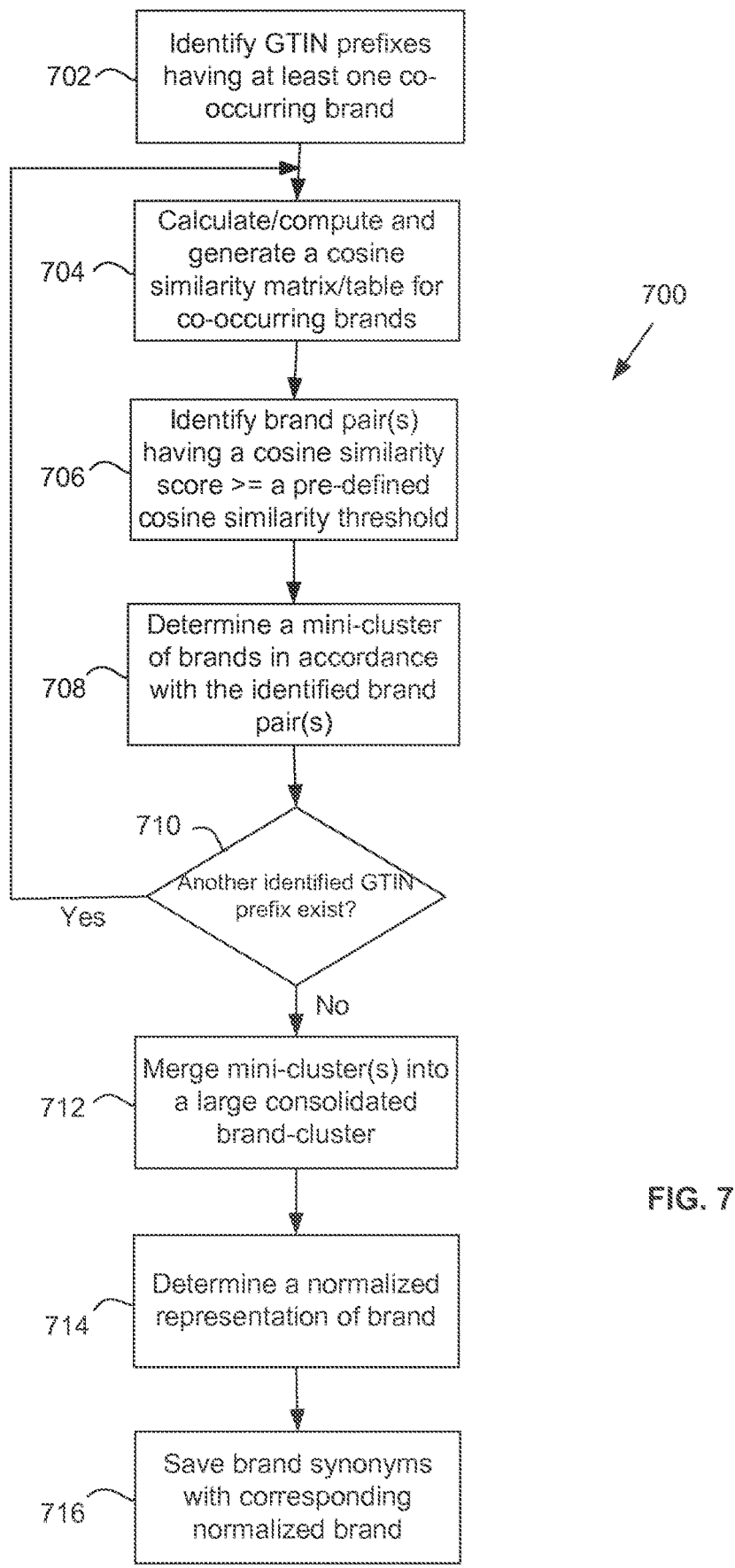
FIG. 7 illustrates a flow diagram for determining brand synonyms according to some embodiments.

FIG. 7 illustrates a flow diagram 700 for determining brand synonyms according to some embodiments. The operations of flow diagram 700 can be performed by a server included in the networked system 102 (e.g., API server 114, web server 116, or application servers 118) and/or third party server 130. At a block 702, the brand synonym module 307 is configured to identify from the above mentioned weight file a group of one or more GTIN prefixes having at least one co-occurring brand in common among them. FIG. 8A shows an example portion of the weight file in which rows 802 and 804 have brand b2 in common but row 806 has no brand in common with either row 802 or 804. Assuming no other GTIN prefixes are associated with a brand in either rows 802 or 804, GTIN prefixes 04003121044 (row 802) and 04003121045 (row 804) comprise the group of identified GTIN prefixes in this example.

Next at a block 704, the brand synonym module 307 is configured to calculate/compute and generate a cosine similarity (score) table/matrix for each of the identified GTIN prefixes. A cosine similarity score provides a measure of the degree of similarity between two alpha numeric text strings, such as strings representative of brand names or variations of brand names. A cosine similarity score of 0 indicates 100% dissimilarity and 1 indicates 100% similarity. Reference is made to http://en.wikipedia.org/wiki/Cosine_similarity which discloses an algorithm for calculating cosine similarity scores. Continuing the example started in FIG. 8A, FIG. 8B illustrates an example cosine similarity table/matrix for the first GTIN prefix 04003121044 (corresponding to row 802 in FIG. 8A). In alternative embodiments, other similarity scoring techniques may be used in place of cosine similarity.

The brand synonym module 307 uses the cosine similarity table/matrix shown in FIG. 8B to identify each brand pair (excluding same-brand pairs) having a cosine similarity score that is equal to or greater than a pre-defined cosine similarity threshold at a block 706. In one embodiment, the pre-defined cosine similarity threshold can be 0.800. In FIG. 8B, it can be seen that two brand pairs satisfy the condition: brand pair (b1, b2) having a cosine similarity score of 0.867 (location 810) and brand pair (b2, b4) having a cosine similarity score of 0.929 (location 812).

Next at a block 708, the brand synonym module 307 is configured to determine a mini-cluster of brands in accordance with the identified brand pair(s). The min-cluster comprises an aggregation or consolidation of the identified brand pair(s) into a single set, thereby eliminating duplicate brand(s). Continuing the example, identified brand pairs (b1, b2) and (b2, b4) converts into a mini-cluster (b1, b2, b4) for GTIN prefix 04003121044 (corresponding to row 802 in FIG. 8A).

If there is another identified GTIN prefix (yes branch of block 710), then blocks 704-708 are repeated for each subsequent identified GTIN prefix to generate a mini-cluster for each of the identified GTIN prefixes. Continuing the example, FIG. 8C shows an example cosine similarity table/matrix corresponding to the second GTIN prefix 04003121045 (corresponding to row 804 in FIG. 8A). Only brand pair (b2, b5) (location 820) has a sufficiently high enough cosine similarity score of 0.832 to qualify as a brand pair. Because there is only a single brand pair for this GTIN prefix, the mini-cluster is the same as the brand pair, namely (b2, b5).

Once all of the mini-clusters for the identified GTIN prefixes have been determined (no branch of block 710), the brand synonym module 307 is configured merge or aggregate the mini-cluster(s) into a larger consolidated brand-cluster at a block 712. The merging/aggregation comprises merging the mini-clusters and eliminating duplications of brands. The members of the brand-cluster comprise the brand synonyms for a given brand. Brand synonyms may also be referred to as similar brands, equivalent brands, a brand grouping, related brands, or variants thereof. Continuing the example, mini-cluster (b1, b2, b4) and mini-cluster (b2, b5) can be combined into a brand-cluster (b1, b2, b4, b5).

Next at a block 714, the brand synonym module 307 is configured to determine a normalized representation of the given brand. The normalized form of the brand comprises the shortest length brand synonym selected from the brand-cluster. In the case where there is more than one brand synonym of the same shortest length, the shortest length brand synonym with the most occurrences is selected as the normalized form. The normalized form of the brand may be considered the brand shorthand. Continuing the example, FIG. 8D shows an example lookup-type of table providing brand synonyms and the normalized form of the brand. It is assumed that brand b4 is the short length brand synonym from the brand-cluster (b1, b2, b4, b5), thereby being selected to be the normalized form of the brand. FIG. 8E shows an example lookup-type brand synonym table for the normalized brand "Sony." The second column represents a listing of the various brand synonyms for "Sony," such as "Sony Music Entertainment," "Sony Columbia," and "Sony Entertainment."

Last, at a block 716, the brand synonyms with the corresponding normalized form (also referred to as a map of brand synonyms) are stored in a file or database to form the brand normalization library 312.

Blocks 702-716 can be repeated as many times as necessary to build a comprehensive map of brand synonyms based on existing item information in the items catalog.

Figure 9:
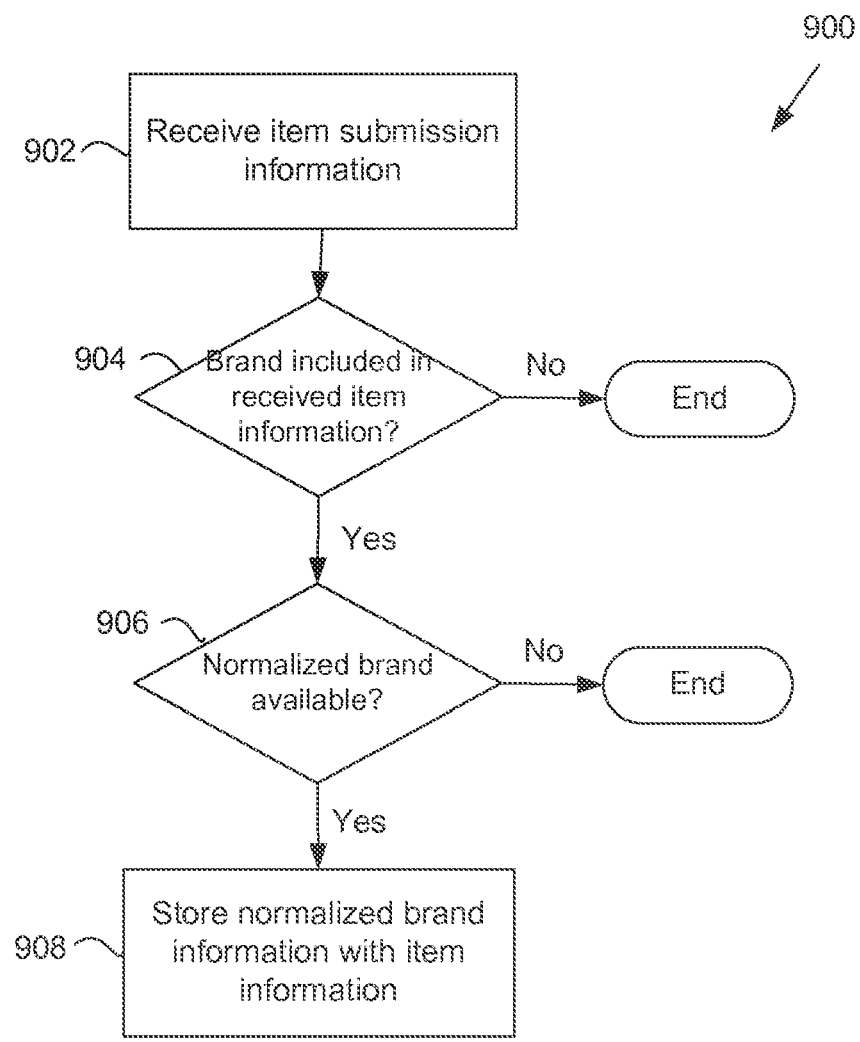
FIG. 9 illustrates a flow diagram showing example uses of the brand synonym map according to some embodiments.

FIG. 9 illustrates a flow diagram 900 showing example uses of the brand synonym map according to some embodiments. The operations of flow diagram 900 can be performed by a server included in the networked system 102 (e.g., API server 114, web server 116, or application servers 118) and/or third party server 130. At a block 902, the networked system 102 receives item information associated with submission of a new item to be offered for sale (or at least listed). As an example, a seller may interface with input fields or screens provided by the networked system 102 to input information about the item being submitted such as, but not limited to, a product identification number (e.g., UPC, EAN, ISBN), brand (e.g., Apple™), product model (e.g., iPad 2), item specification (e.g., color, size, configuration, included accessories, etc.), and/or photos of the item.

Next at a block 904, a check is performed to whether a brand name is included in the received item information. If no brand name is provided (no branch of block 904), then the flow diagram 900 ends. Otherwise a brand name is included (yes branch of bock 904), and the brand synonym module 307 and/or item aspects verification module 304 is configured to access the brand normalization library 312 (populated from brand synonyms discussed with respect of FIG. 7) to look-up a normalized brand corresponding to the brand included in the received item information at a block 906. If no normalized brand is available (no branch of block 906), then the flow diagram 900 ends. If a normalized brand is available (yes branch of block 906), then the normalized brand information is associated with the newly submitted item and stored accordingly. The availability of normalized brand information for an item is useful for downstream processes such as, but not limited to, product searching, product matching, product aggregation, product deduping, product attribute value normalization, and the like.

In this manner, historical or existing item information in a product catalog and/or product information available on the web is used to determine a probabilistic prediction of a product source identifier (e.g., brand name) for each product identification number encoded in any one of a plurality of different formats. The various formatted product identification numbers are standardized into 13-digit GTIN values. A weight file comprising a correlation of GTIN prefixes, count of occurrences of each given brand name, count of co-occurrences of each given brand name, and the relative co-occurrence probabilities is generated using the existing product catalog and/or product information available on the web. Based on such brand classification or prediction model, the brand names provided with subsequent items that are submitted and/or to be added to the product catalog can be validated. Even if no brand names are provided with the subsequent items, the weight file is used to predict a brand with a certain confidence score (e.g., filling in missing brand information) based on the provided product identification number for a given subsequent item.

Moreover, groupings of similar or equivalent brand names are determined using the weight file. A set of GTIN prefixes having co-occurring brand(s) within the weight file are identified. For each of the identified GTIN prefixes, the textual similarity of brand names corresponding to the given GTIN prefix is calculated. When the degree of textual similarity between a pair of non-identical brand names is at or above a pre-defined threshold value, the brand names in that pair are considered to be similar, equivalent, or synonyms to each other. The aggregation of all of such brand pairs for the identified set of GTIN prefixes provides a grouping of a similar brand name. One of the brand names from the grouping is selected, usually the brand name of the shortest text length, to be the normalized or shorthand brand name for the grouping. This process can be repeated as many times as necessary to identify all of the possible groupings of brand synonyms given data stored in the product catalog. Brand synonyms can be used to expand identification of items matching a user's request or search for items. Brand synonyms can also be used to expand identification of items to recommend to a user. Brand synonyms aids in comparison of items, especially new items being submitted for inclusion in the product catalog.

Figure 10:
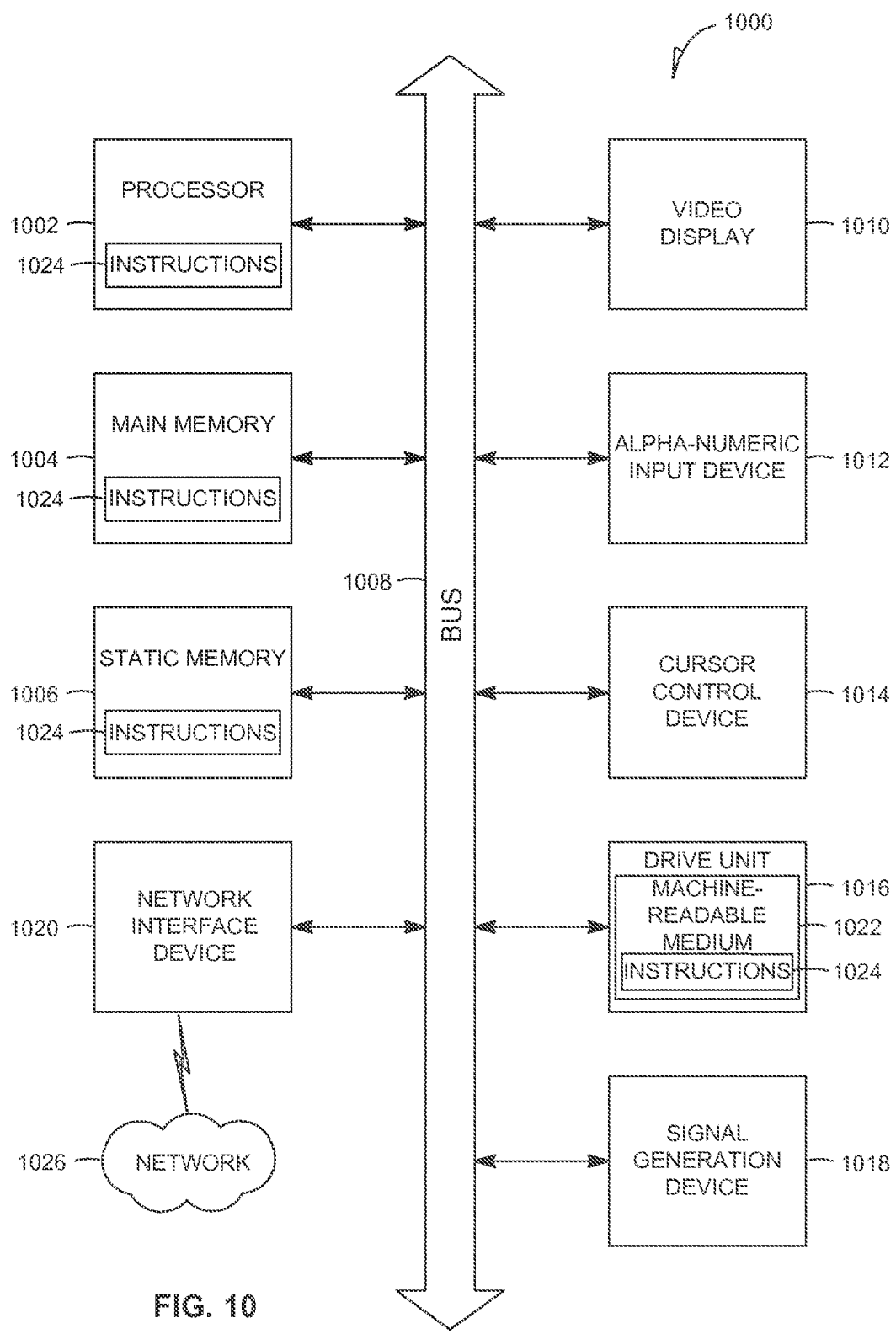
FIG. 10 illustrates a diagrammatic representation of a machine in the example form of a computer system within which a set of instructions, for causing the machine to perform any one or more of the methodologies of FIGS. 2-9 according to some embodiments.

FIG. 10 shows a diagrammatic representation of a machine in the example form of a computer system 1000 within which a set of instructions, for causing the machine to perform any one or more of the methodologies discussed herein, may be executed. The computer system 1000 comprises, for example, any of the device machine 110, device machine 112, applications servers 118, API server 114, web server 116, database servers 124, or third party server 130. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., liquid crystal display (LCD), organic light emitting diode (OLED), touch screen, or a cathode ray tube (CRT)). The computer system 1000 also includes an alphanumeric input device 1012 (e.g., a physical or virtual keyboard), a cursor control device 1014 (e.g., a mouse, a touch screen, a touchpad, a trackball, a trackpad), a disk drive unit 1016, a signal generation device 1018 (e.g., a speaker) and a network interface device 1020.

The disk drive unit 1016 includes a machine-readable medium 1022 on which is stored one or more sets of instructions 1024 (e.g., software) embodying any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

The instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the spirit and scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
    identifying, by a hardware processor, for each of a plurality of global trade item number (GTIN) CTIN prefixes, brand names and counts of each of the brand names using product information stored in a product catalog;
    determining a probability distribution of the brand names in accordance with the brand names and the counts of the brand names for the plurality of GTIN prefixes;
    predicting a brand name for a product from among the brand names for the plurality of GTIN prefixes, based on the probability distribution of the brand names;
    classifying the product in the product catalog in accordance with the predicted brand name;
    searching the product catalog to identify the product based at least in part on the predicted brand name;

receiving input indicating a request to purchase the identified product in response to the searching; and performing a purchase transaction for the identified product based on the received second input.

2. The method of claim 1, further comprising:
converting a product identification number for a product into a normalized GTIN; and
generating the plurality of GTIN prefixes from the normalized GTIN, each of the plurality of GTIN prefixes associated with the product identification number, respective GTIN prefixes of the plurality of GTIN prefixes being of different textual lengths.

3. The method of claim 2, wherein the product identification number comprises at least one of a universal product code (UPC), an international article number (EAN), or an international article numbering association (ISBN).

4. The method of claim 2, wherein the normalized GTIN comprises a checksum validated 13-digit GTIN.

5. The method of claim 2, further comprising receiving product information for the product to add the product to the product catalog, the product information including at least the product identification number.

6. The method of claim 5, wherein the product information includes submission brand name, the method further comprising:
validating the submission brand name against the predicted brand name, wherein the classification of the product in accordance with the predicted brand name is in response to the submission brand name being equivalent to the predicted brand name; and
notifying a seller of a second product in response to a submission brand name of the second product not matching a predicted brand name of the second product.

7. The method of claim 1, further comprising receiving product information for the product to add the product to the product catalog, the product information missing brand name information for the product, wherein the classification of the product in accordance with the predicted brand name is in response to the missing brand name information.

8. The method of claim 2, wherein the plurality of GTIN prefixes comprises one or more of a first six-digits of the normalized GTIN, a first seven-digits of the normalized GTIN, a first eight-digits of the normalized GTIN, a first nine-digits of the normalized GTIN, or a first ten-digits of the normalized GTIN.

9. A system, comprising:
hardware processing circuitry;
a hardware memory storing instructions that when executed configure the hardware processing circuitry to perform operations comprising:
identifying, by a hardware processor, for each of a plurality of global trade item number (GTIN) prefixes, brand names and counts of each of the brand names using product information stored in a product catalog;
determining a probability distribution of the brand names in accordance with the brand names and the counts of the brand names for the plurality of GTIN prefixes;
predicting a brand name for a product from among the brand names for the plurality of GTIN prefixes, based on the probability distribution of the brand names;
classifying the product in the product catalog in accordance with the predicted brand name;
searching the product catalog to identify the product based at least in part on the predicted brand name;
receiving input indicating a request to purchase the identified product in response to the searching; and performing a purchase transaction for the identified product based on the received second input.

10. The system of claim 9, the operations further comprising:
converting a product identification number for a product into a normalized GTIN; and
generating the plurality of GTIN prefixes from the normalized GTIN, each of the plurality of GTIN prefixes associated with the product identification number, respective GTIN prefixes of the plurality of GTIN prefixes being of different textual lengths.

11. The system of claim 10, wherein the product identification number comprises at least one of a universal product code (UPC), an international article number (EAN), or an international article numbering association (ISBN).

12. The system of claim 10, wherein the normalized GTIN comprises a checksum validated 13-digit GTIN.

13. The system of claim 10, the operations further comprising receiving product information for the product to add the product to the product catalog, the product information including at least the product identification number.

14. The system of claim 13, wherein the product information includes a submission brand name, the operations further comprising:
validating the submission brand name against the predicted brand name, wherein the classification of the product in accordance with the predicted brand name is in response to the submission brand name being equivalent to the predicted brand name; and
notifying a seller of a second product in response to a submission brand name of the second product not matching a predicted brand name of the second product.

15. The system of claim 9, the operations further comprising receiving product information for the product to add the product to the product catalog, the product information missing brand name information for the product, wherein the classification of the product in accordance with the predicted brand name is in response to the missing brand name information.

16. The system of claim 9, wherein the product information stored in the product catalog corresponds to a plurality of products offered for sale by an online marketplace.

17. The system of claim 10, wherein the plurality of GTIN prefixes comprises one or more of a first six-digits of the normalized GTIN, a first seven-digits of the normalized GTIN, a first eight-digits of the normalized GTIN, a first nine-digits of the normalized GTIN, or a first ten-digits of the normalized GTIN.

18. A system, comprising:
hardware processing circuitry;
a hardware memory storing instructions that when executed configure the hardware processing circuitry to perform operations comprising:
receiving input indicating an instruction to search a product catalog based on a searched product brand name;
receiving a result of the search, the result identifying a product having a brand name matching the searched product brand name, the matching brand name being predicted based on a probability distribution of a plurality of brand names for each of a plurality of global trade item number (GTIN) prefixes, the probability distribution in accordance with the plurality of brand names and corresponding counts of each of the plurality of brand names;
receiving input indicating an instruction to purchase the identified product;

receiving a confirmation of the purchase of the identified product; and displaying data indicating the confirmation of the purchase on an electronic display.

19. The system of claim 18, wherein the plurality of GTIN prefixes are generated from normalized GTINs, the normalized GTINs determined by converting product identification numbers for a product into the normalized GTINs.

20. The system of claim 19, wherein the normalized GTINs each comprise a checksum validated 13-digit GTIN.

* * * * *